US006578085B1

(12) United States Patent
Khalil et al.

(10) Patent No.: US 6,578,085 B1
(45) Date of Patent: Jun. 10, 2003

(54) SYSTEM AND METHOD FOR ROUTE OPTIMIZATION IN A WIRELESS INTERNET PROTOCOL NETWORK

(75) Inventors: Mohamed M. Khalil, Dallas, TX (US); Emad Q. Qaddoura, Plano, TX (US); Haseeb Akhtar, Garland, TX (US); Liem Le, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/369,944

(22) Filed: Aug. 6, 1999

Related U.S. Application Data
(60) Provisional application No. 60/117,371, filed on Jan. 27, 1999.

(51) Int. Cl.[7] .............................................. G06F 13/14
(52) U.S. Cl. ....................................... 709/241; 709/245
(58) Field of Search .............................. 370/313, 356, 370/409, 466, 328, 338; 455/433, 435; 709/228, 238, 241, 245

(56) References Cited

U.S. PATENT DOCUMENTS

| | | | | |
|---|---|---|---|---|
| 5,708,655 A | * | 1/1998 | Toth et al. ................... 370/313 |
| 6,144,671 A | * | 11/2000 | Perinpanathan et al. .... 370/409 |
| 6,172,986 B1 | * | 1/2001 | Watanuki et al. ........... 370/466 |
| 6,195,705 B1 | * | 2/2001 | Leung .......................... 709/245 |
| 6,230,012 B1 | * | 5/2001 | Willkie et al. ............... 455/435 |
| 6,240,514 B1 | * | 5/2001 | Inoue et al. .................. 713/153 |
| 6,243,758 B1 | * | 6/2001 | Okanoue ...................... 709/238 |
| 6,272,129 B1 | * | 8/2001 | Dynarski et al. ............ 370/356 |
| 6,282,577 B1 | * | 8/2001 | Okanoue et al. ............. 709/250 |
| 6,407,988 B1 | * | 6/2002 | Agraharam et al. ........ 370/328 |
| 6,434,134 B1 | * | 8/2002 | La Porta et al. ............. 370/338 |
| 6,452,920 B1 | * | 9/2002 | Comstock ................... 370/349 |
| 6,496,704 B2 | * | 12/2002 | Yuan ........................... 455/466 |
| 2001/0012777 A1 | * | 8/2001 | Igarashi et al. ............. 455/435 |
| 2001/0016492 A1 | * | 8/2001 | Igarashi et al. ............. 455/433 |
| 2002/0021680 A1 | * | 2/2002 | Chen ........................... 370/331 |
| 2002/0059452 A1 | * | 5/2002 | Yokota et al. ............... 709/238 |

FOREIGN PATENT DOCUMENTS

| | | | | |
|---|---|---|---|---|
| EP | 1030491 A2 | * | 8/2000 | ........... H04L/29/06 |
| EP | 1030491 A3 | * | 9/2002 | ........... H04L/29/06 |
| WO | WO 00/41418 | * | 7/2000 | ............. H04Q/7/24 |

OTHER PUBLICATIONS

Perkins, Charles, et al., "Route Optimization in Mobile IP", Mobile IP Working Group, Internet Draft, http://www.ietf.org/internet–drafts/draft–ietf–mobileip–optim–08.txt, Feb. 25, 1999, 25 pages.

(List continued on next page.)

Primary Examiner—Christine K. Oda
Assistant Examiner—Walter Benson
(74) Attorney, Agent, or Firm—Haynes and Boone, LLP (57) ABSTRACT

A system and method for route optimization in a wireless Internet Protocol (IP) network. The system and method send, to a home agent, a data packet; transmit, to a mobile node, the data packet using a first address; maintain a list of correspondent nodes associated with the mobile node; send, to the correspondent node, a binding update message; and transmit, directly to the mobile node, subsequent data packets using the first address. The system and method additionally: transmit, to a home agent, a registration request comprising a new address; transmit, to a mobile node, a registration reply in response to the registration request; compare the new address to an old address; if the new address and the old address are not equal, transmit, to the correspondent node, a binding update message; transmit, to the home agent, a binding acknowledgment in response to the binding update message; and transmit, to the mobile node, all subsequent messages via the new address.

38 Claims, 9 Drawing Sheets

OTHER PUBLICATIONS

Perkins, C. E. et al., "Mobility Support in IPV6" Mobicom. Proceedings of the Annual International Conference on Mobile Computing and Networking Nov. 10–12, 1996, New York, pp. 1–11.

Jain, R. et al., "Mobile Internet Access and QoS Guarantees Using Mobile IP and RSVP with Location Registers", Communications, 1998, ICC 98. Conference Record. 1998 IEEE International Conference on Atlanta, GA. Jun. 7–11, 1998, New York, NY Jun. 7, 1998, pp. 1690–1695.

Solomon, J. D., "Mobile IP. The Internet Unplugged", 1998 Prentice Hall, Upper Saddle River, NJ.

* cited by examiner

SYSTEM AND METHOD FOR ROUTE OPTIMIZATION IN A WIRELESS INTERNET PROTOCOL NETWORK

CROSS REFERENCE

This application claims the benefit of provisional application assigned U.S. serial No. 60/117,371 filed on Jan. 27, 1999.

BACKGROUND

This disclosure relates generally to wireless communication networks and, more particularly, to a system and method for route optimization in a wireless Internet Protocol (IP) network.

One common communication language, or protocol, used in communication networks is Transmission Control Protocol/Internet Protocol (TCP/IP). TCP/IP facilitates the transfer of information in various network types, including the Internet, intranets and extranets, and wireless networks.

TCP/IP is a two-layered program. The Transmission Control Protocol (TCP), which refers to the higher layer, manages the assembling of a message or file into smaller packets that are transmitted over a particular network and received by a TCP layer that reassembles the packets into the original message. The Internet Protocol (IP), which refers to the lower layer, handles the address part of each packet so that it gets to the proper destination. Each source on the network checks this address to see where to forward the message. Even though some packets from the same message are routed differently than others, they are reassembled at the destination.

TCP/IP uses a client/server model of communication. For example, a computer user (a client) requests and is provided a specific Web page (a service) by another computer (a server) in the network. TCP/IP communication is primarily point-to-point, meaning each communication is from one point (or host computer) in the network to another point or host computer. TCP/IP and the higher-level applications that use it are collectively said to be "connectionless" because each client request is considered a new request unrelated to any previous one (unlike ordinary phone conversations that require a dedicated connection for the call duration). Being connectionless, network paths are free and can thus be used continuously. It is understood that the TCP layer itself is not connectionless as far as any one message is concerned. Its connection remains in place until all packets in a message have been received. It is further understood that the general characteristics of TCP/IP are well known to those of average skill in the art and thus will not be described further herein.

Certain TCP/IP networks allow the use of mobile nodes, such as a laptop computer equipped with a wireless Local Area Network (LAN) card. Such a network provides a user with the ability to access services using their mobile node while moving through the network. While accessing these services, however, packets may be lost, thus degrading the quality of the service and the network may not be utilized in an optimal fashion thereby causing various inefficiencies.

In order to address these problems, one prior art route optimization theory suggests sending packets (or datagrams) from a correspondent node (such as a personal computer) to a mobile node without going through a home agent (HA, such as a server). The prior art optimization theory assumes that all foreign networks contain foreign agents (FAs).

In certain situations, however, a foreign network may not contain a FA. For example, a foreign network may simply not have a configured FA or may lose the FA due to system failure. If the foreign network does not contain a FA, a collocated care-of-address (CCOA) is provided to mobile nodes, instead of a conventional care-of-address (COA). As a mobile node moves to a new foreign network, it obtains a new CCOA and then registers with the new foreign network. According to the prior art route optimization theory, however, a correspondent node will not be updated with the mobile node's COA until after a predetermined period of time has expired. Specifically, the correspondent node's binding cache entry for the mobile node in the old foreign network must expire before the correspondent node is updated with the new COA. Until that occurs, the correspondent node will continue to send data packets to the old COA which will cause loss of data and service degradation.

SUMMARY

A technical advance is provided by a system and method for route optimization in a wireless Internet Protocol (IP) network. In one embodiment, the system sends a data packet to a home agent of the IP network and then transmits the data packet to a mobile node using a first address. A list of correspondent nodes associated with the mobile node is maintained so that one or more messages, such as a binding update message, can be sent. Thereafter, subsequent data packets can be transmitted directly to the mobile node using the first address.

In another embodiment, the system transmits a registration request, including a new address, to the home agent and transmits a registration reply in response to the registration request to the mobile node. The new address is then compared to an old address. If the new address and the old address are not equal, a binding update message is transmitted to the correspondent node and a binding acknowledgment message is transmitted to the home agent in response. Thereafter, all subsequent messages are transmitted to the mobile node via the new address.

In another embodiment, the system sends a de-registration request to the home agent when the mobile node returns to its home location. A binding update message is sent to a correspondent node so that the binding update message includes a lifetime value of zero. The mobile node's entry at the prior location is then invalidated.

In another embodiment, the system maintains a list of correspondent nodes with which the mobile node is currently communicating. If the mobile node changes its address, a registration request is sent to the home agent with a correspondent node extension (CNE), the CNE including the list of correspondent nodes. A binding update is then sent by the home agent to each of the correspondent nodes on the list. Each of the correspondent nodes may then respond to the home agent with a binding acknowledgment message.

These embodiments, as well as others which will become apparent, are achieved in a system that includes a plurality mobile nodes and correspondent nodes that communicate with each other through various combinations of new and old foreign networks and foreign agents, discussed in greater detail below.

DETAILED DESCRIPTION

To better understand the present invention, an exemplary environment may first be discussed. FIGS. 1–6 discuss many conventional techniques in conventional communication networks. However, these techniques are arranged to facilitate the disclosure of the present invention. It is understood that the following disclosure provides many different embodiments, or examples, for implementing different features. Techniques and requirements that are only specific to certain embodiments should not be imported into other embodiments. Also, specific examples of networks, components, and messages are described below to simplify the present disclosure. These are, of course, merely examples and are not intended to limit the invention from that described in the claims.

Figure 1:
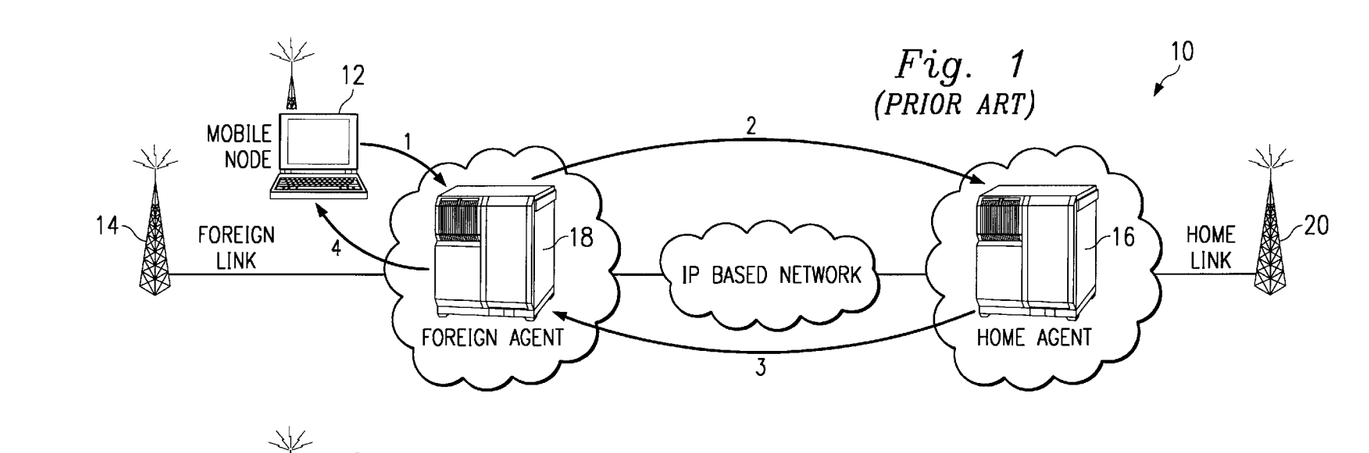
FIG. 1 is a diagrammatic view of a system depicting a mobile node registration.

Referring to FIG. 1 the reference numeral 10 designates, in general, an IP network. A mobile node 12 registers with the network 10 by sending (1) a request for service message to a foreign agent (FA) 18 via a foreign link (or base station) 14. The FA 18 is a server operated, for example, by an internet service provider (ISP) outside of the user's local ISP server (or HA 16). In this scenario, the user has traveled away from his HA's 16 service area and thus must register with the FA 18. The FA 18 relays (2) the request for service to the user's HA 16 via the home link (or base station) 20. The HA 16 may then accept or deny the request and the decision is then relayed (3,4) to the mobile node 12 via the FA 18 and the foreign link 14.

Figure 2:
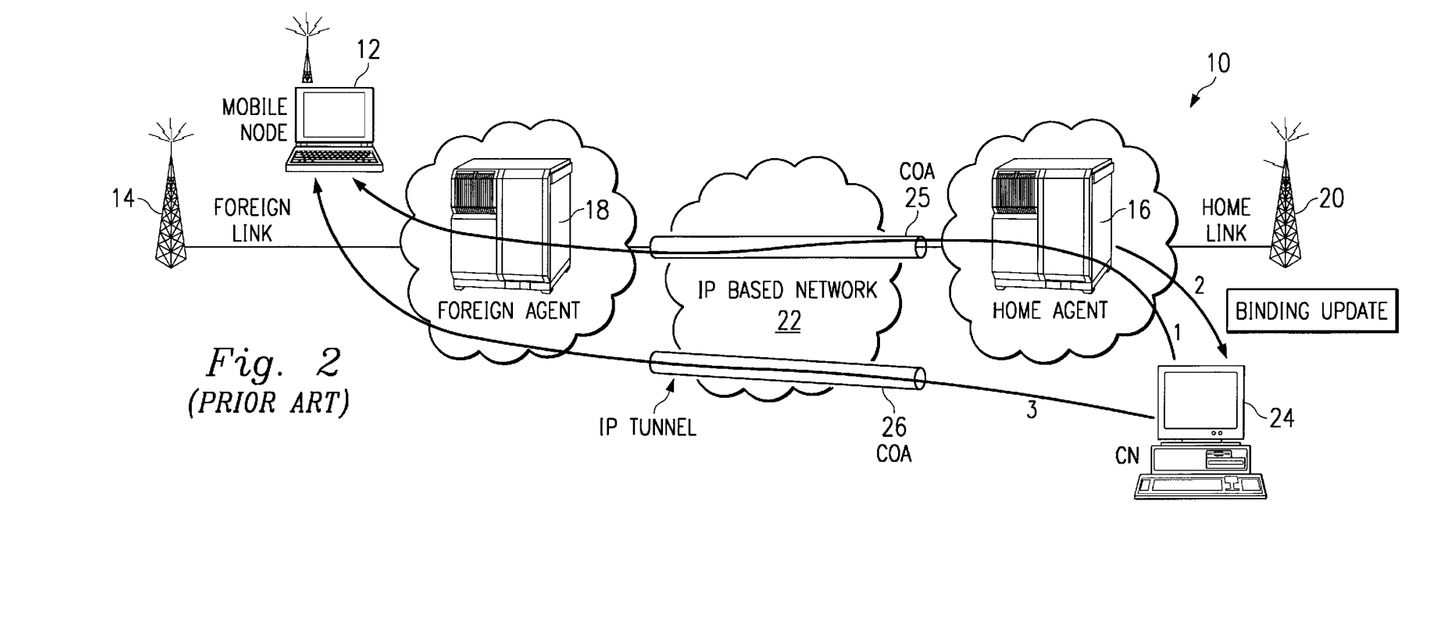
FIG. 2 is a diagrammatic view of a system depicting a correspondent node sending packets to a mobile node.

Referring to FIG. 2, a correspondent node 24 is also provided to the network 10 of FIG. 1. In the present example, the correspondent node 24 provides packets to the mobile node 12. A first packet is intercepted (1) by the HA 16 and then sent to the mobile node via the IP based network 22 and the HA's care-of-address (COA, also known as an IP address) 25. The HA 16 intercepts the correspondent node's 24 packet because, based on the contents of the received packet, the HA deduces that the correspondent node's binding cache does not contain the mobile node's new COA. The binding cache (or cache) contains the old (if utilizing an old FA) and new (if utilizing a new FA) IP addresses (or COA's) assigned to the mobile node 12. Based on these IP addresses, a correspondent node may "tunnel" packets directly to a mobile node. Thus, the HA 16 sends (2) a binding update message to the correspondent node 24. The correspondent node 24 then updates its binding cache and will start to use this COA 26 to forward (3) data directly to the mobile node 12. This scenario, known as triangle routing, is a limitation of the prior art route optimization theory because the correspondent node's packets to a mobile node follow a path which is longer than the optimal path (since the packets must initially be forwarded to the mobile node via the HA).

Figure 3:
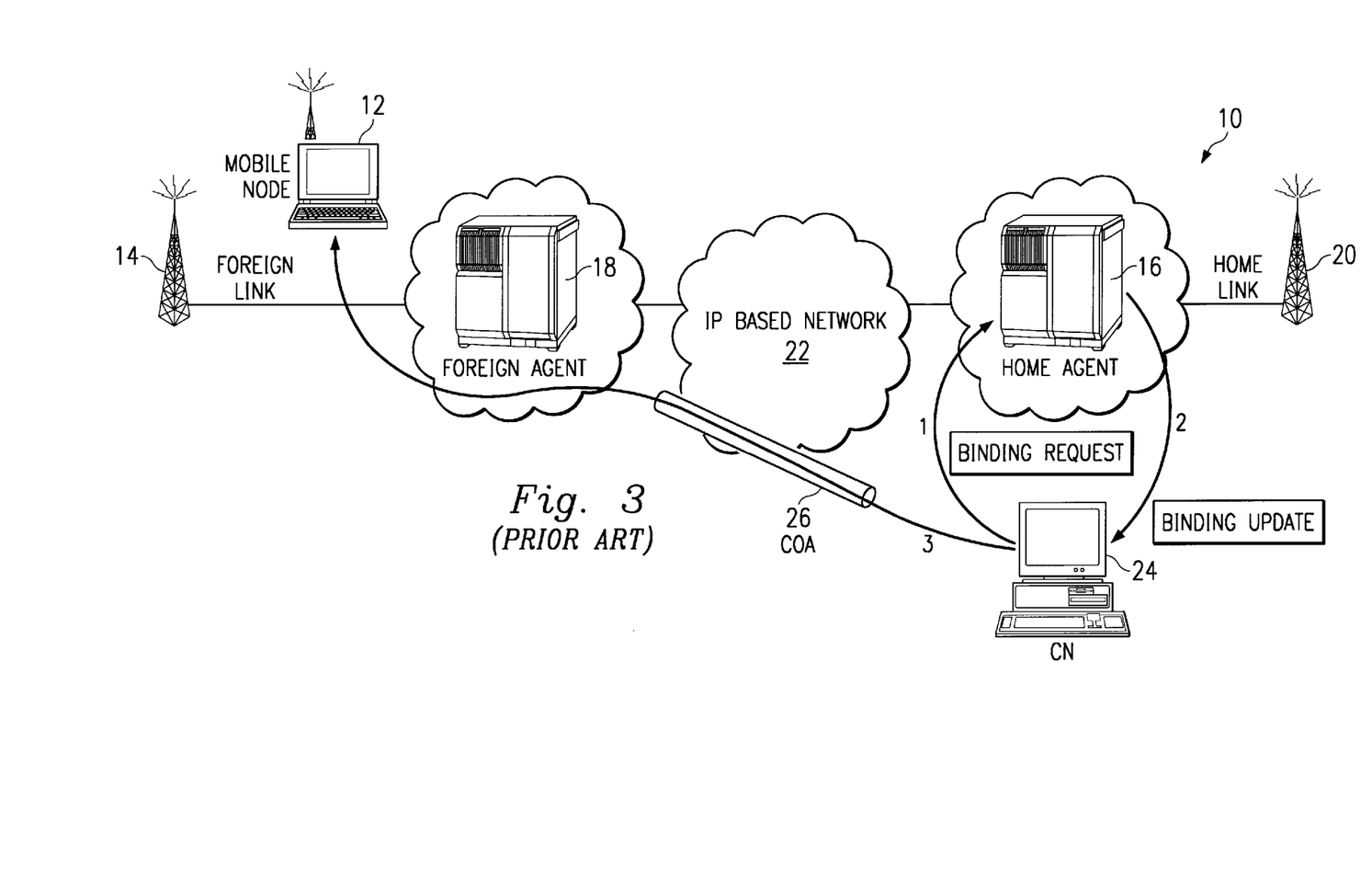
FIG. 3 is a diagrammatic view of a system depicting a correspondent node sending a binding request to a home agent.

Referring to FIG. 3, the correspondent node 24 sends (1) a binding request to the HA 16 to update the correspondent node's binding cache with the mobile node's 12 new COA. This binding request is sent when the registration lifetime (or lifetime) between the correspondent node 24 and the old COA (not shown) expires (is equal to zero). The registration lifetime is the time duration for which a binding, which is approved by the HA 16, is valid. The HA 16 then sends a binding update to the correspondent node with the current mobile node's COA. The correspondent node 24 may then send (3) data directly to the mobile node's COA 26.

Figure 4:
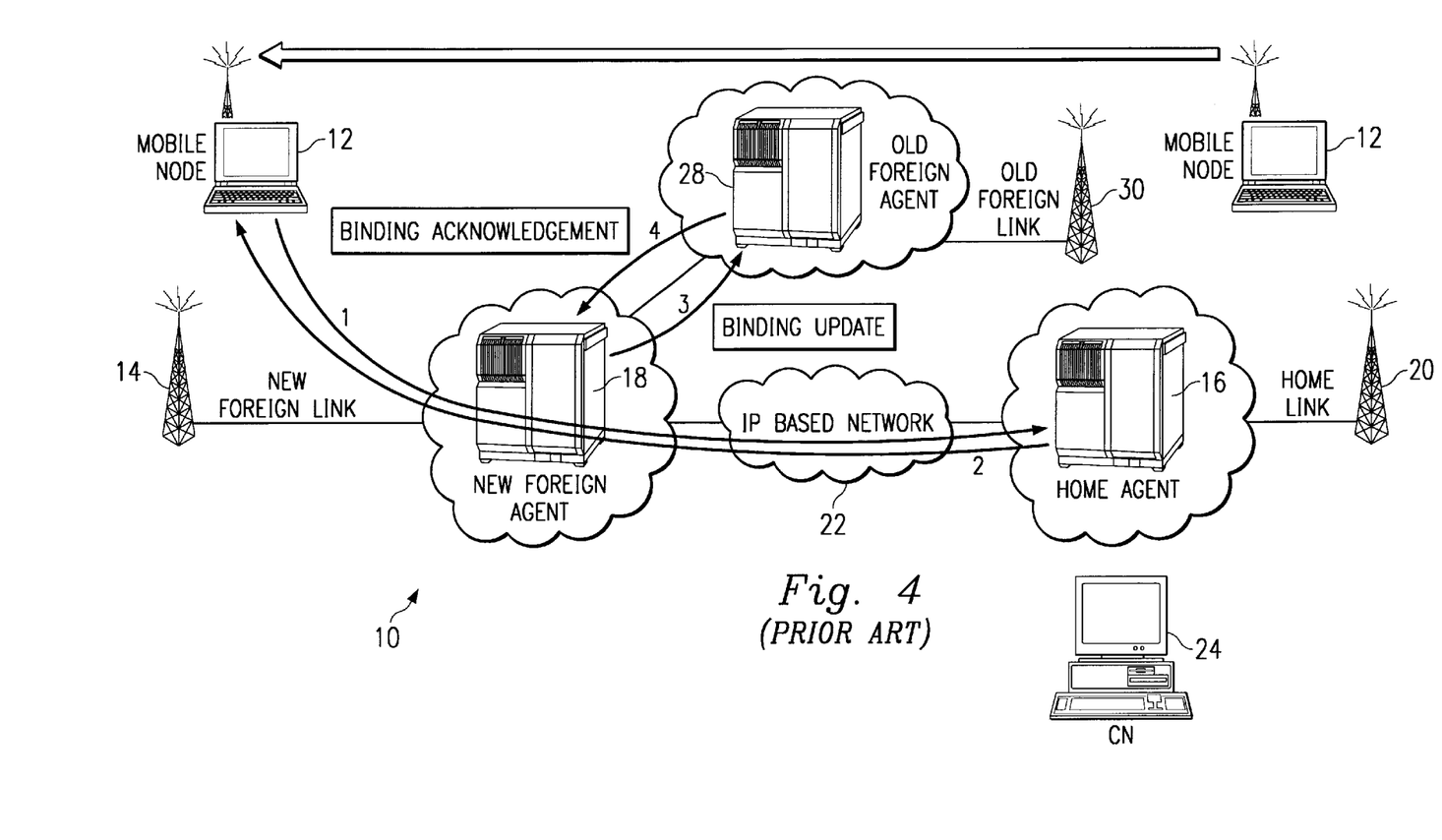
FIG. 4 is a diagrammatic view of a system depicting a mobile node moving from an old foreign agent to a new foreign agent.

FIG. 4 depicts the addition of an old FA 28 to the network 10. The mobile node 12 is utilizing the network 10 via the old FA 28 and the old foreign link 30. As the mobile node 12 travels from the coverage area of the old FA 28 to the coverage area of the new FA 18, the mobile node 12 sends (1) a registration request that contains the new FA's 18 COA. The HA 16 sends (2) a registration reply back to the mobile node 12. The new FA then sends (3) a binding update to the old FA 28 to give the old FA the new COA. The old FA 28 then sends (4) a binding acknowledgment to the new FA.

Figure 5:
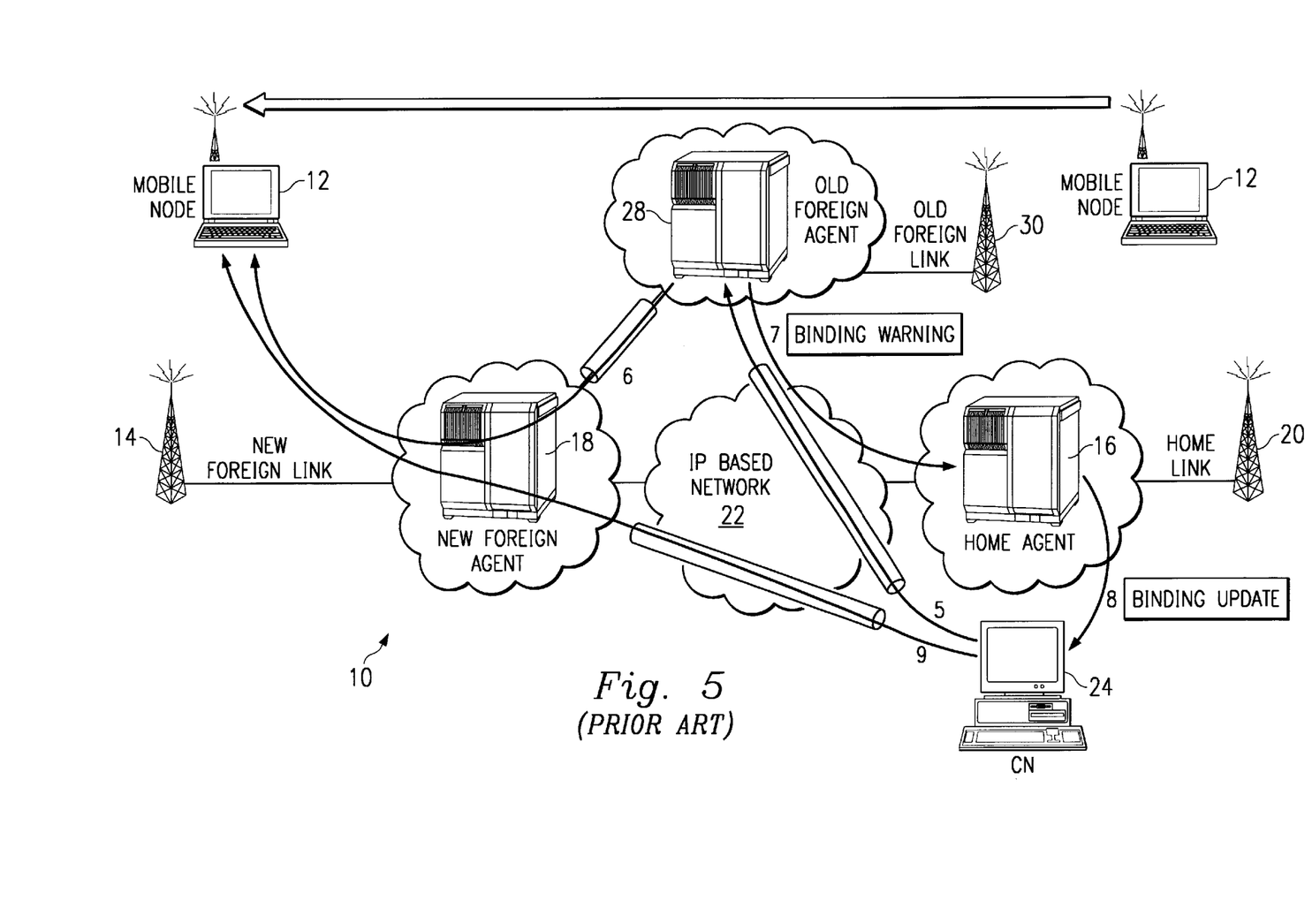
FIG. 5 is diagrammatic view of a system depicting a correspondent node sending data directly to a mobile node via a new foreign agent's care-of-address.

FIG. 5 depicts the continuation of the messaging in FIG. 4. The correspondent node 24 attempts to send data to the mobile node 12. Since the correspondent node 24 is not aware of the mobile node's 12 new FA 18 COA, it sends (5) the data to the old FA 28. The old FA 28 then forwards (6) the data to the mobile node 12 via the new FA's 18 COA. The old FA 28 also sends a binding warning (7) to the HA 16. The HA 16 then sends (8) a binding update to the correspondent node 24 with the mobile node's 12 new COA. This binding update can only be made if the correspondent node's 24 registration lifetime has expired. Once this action has occurred, the correspondent node 24 can send data directly to the mobile node 12 via the new FA's 18 COA.

The current optimization theory assumes that all foreign networks contain FA's. In certain situations, however, a foreign network may not contain a FA. Such situations include not having a configured FA in a foreign network or losing the FA due to system failure. If the foreign network does not contain a FA, a collocated care-of-address (CCOA) instead of a COA may be used.

Figure 6:
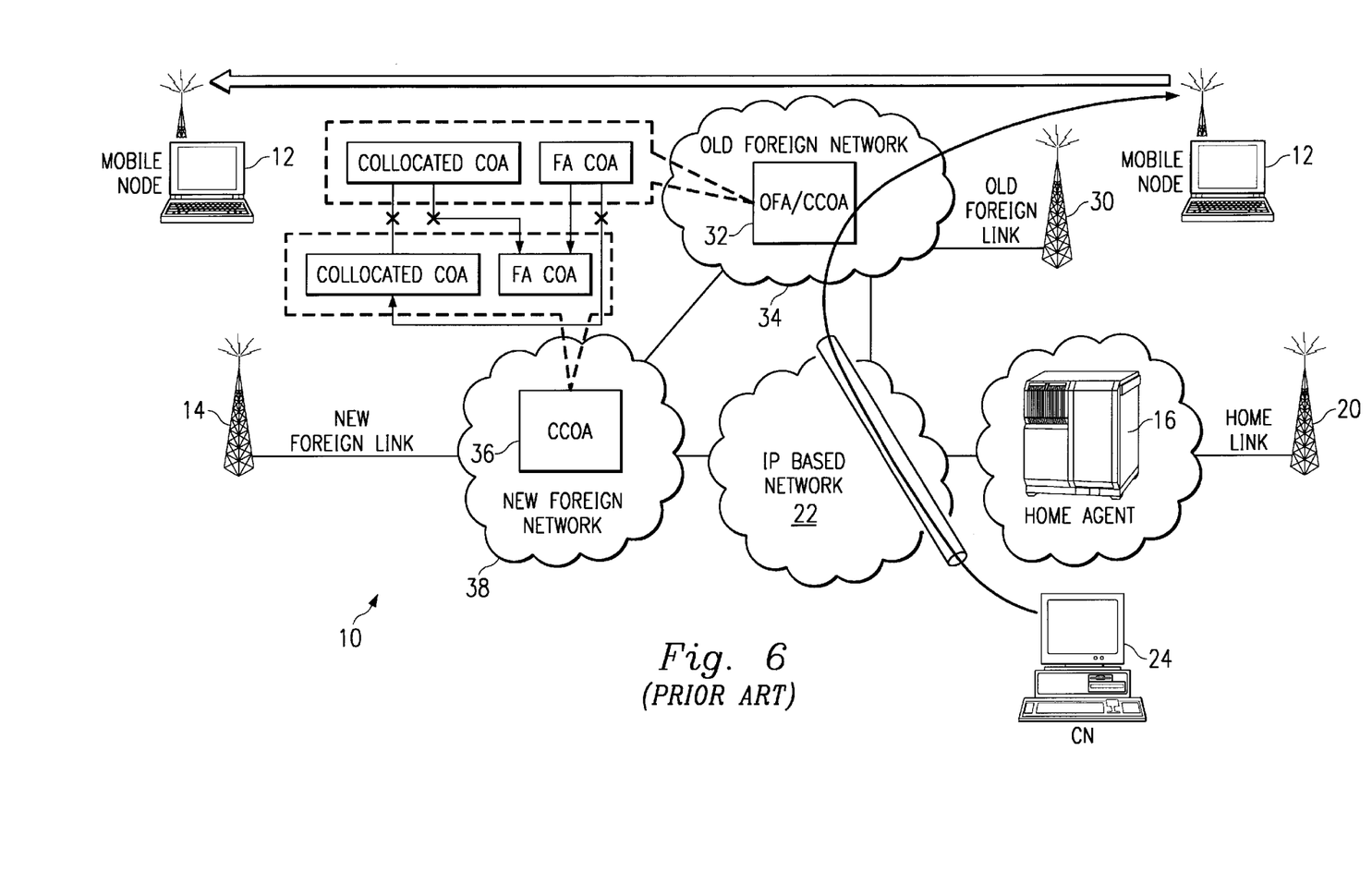
FIG. 6 is diagrammatic view of a system depicting the use of a collocated care-of-address.

FIG. 6 depicts the network 10 including an old foreign network 34, which contains an old FA with CCOA capability 32, and a new foreign network 38, which contains a server with CCOA capability 36, but not a new FA. As the mobile node 12 moves to the new foreign network 38, it obtains a new CCOA and then registers with the new foreign network 38. According to the prior art route optimization theory, however, the correspondent node 24 will not be updated with the mobile node's 12 COA until the correspondent node's binding cache entry for the mobile node 12 in the old foreign network 34 expires. Before that occurs, the correspondent node 24 will continue to send data packets to the old COA which will cause loss of data and service degradation.

Figure 7:
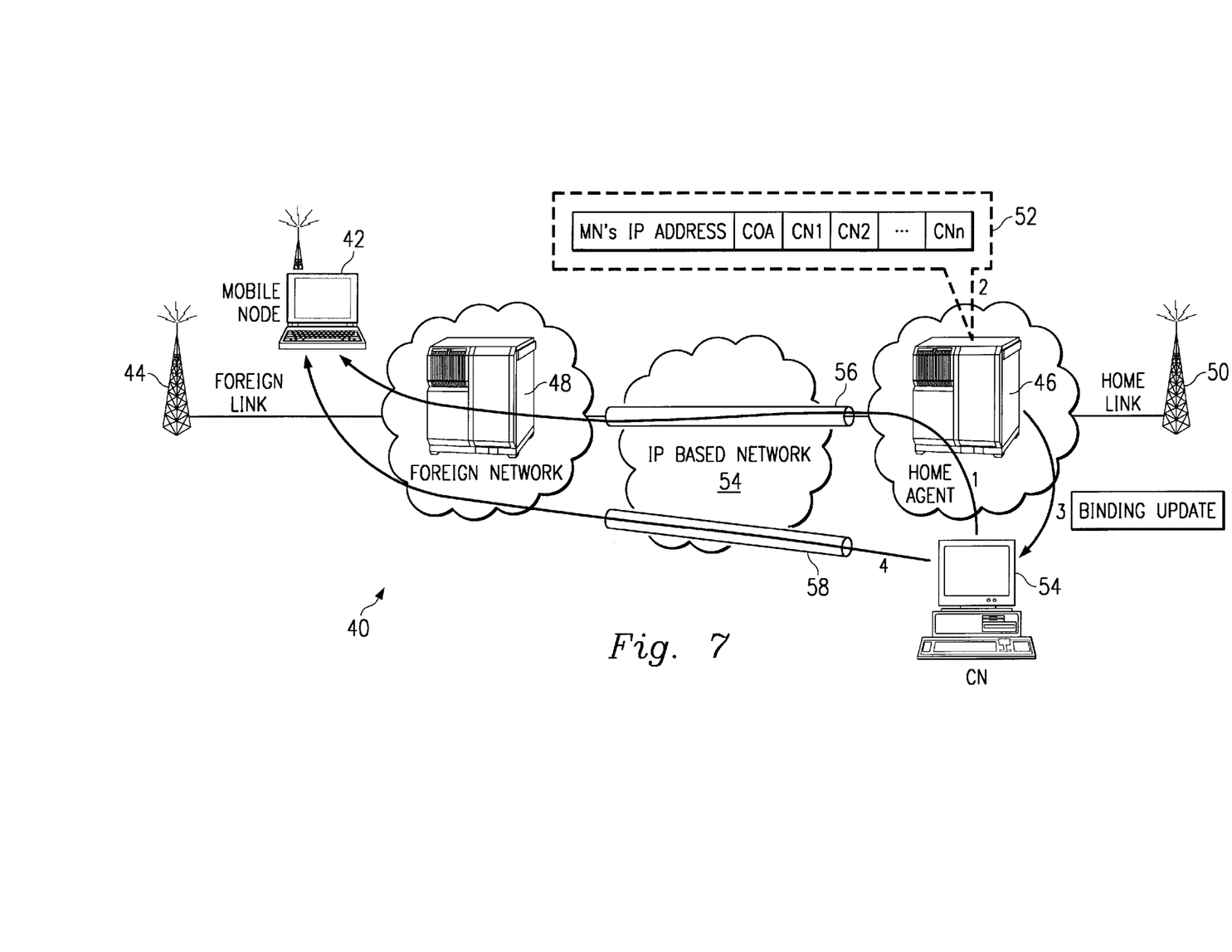
FIG. 7 is a diagrammatic view of a system depicting a correspondent node sending data packets to a mobile node of the present disclosure.

Referring now to FIG. 7, the reference numeral 40 designates a communication network system for implementing one embodiment of the present invention. It is understood that the system 40 does not include a foreign agent. A correspondent node's 54 first packet to the mobile node 42 is intercepted (1) by the HA 46 (via the home link 50) and then sent to the mobile node via the IP based network 54 and the HA's care-of-address (COA, also known as an IP address or an address) 56. The HA 46 intercepts the correspondent node's 24 packet because, based on a list 52 (maintained (2) by the HA) that includes the correspondent nodes associated with each mobile node, the HA deduces that the correspondent node's binding cache does not contain the mobile node's new COA 58. The binding cache (or cache) contains the old (if utilizing an old FA) and new (if utilizing a new FA) IP addresses (or COA's) assigned to the mobile node 42. Based on these IP addresses, a correspondent node may "tunnel" packets directly to a mobile node. Thus, the HA 46 sends (3) a binding update message to the correspondent node 54. The correspondent node 24 then updates its binding cache and will start to use this COA 58 to forward (4) data directly to the mobile node 42 (via a foreign network 48 and foreign link 44). This scenario provides the ability for packets to reach the mobile node 42 without the benefit of the capabilities of a foreign agent.

Figure 8:
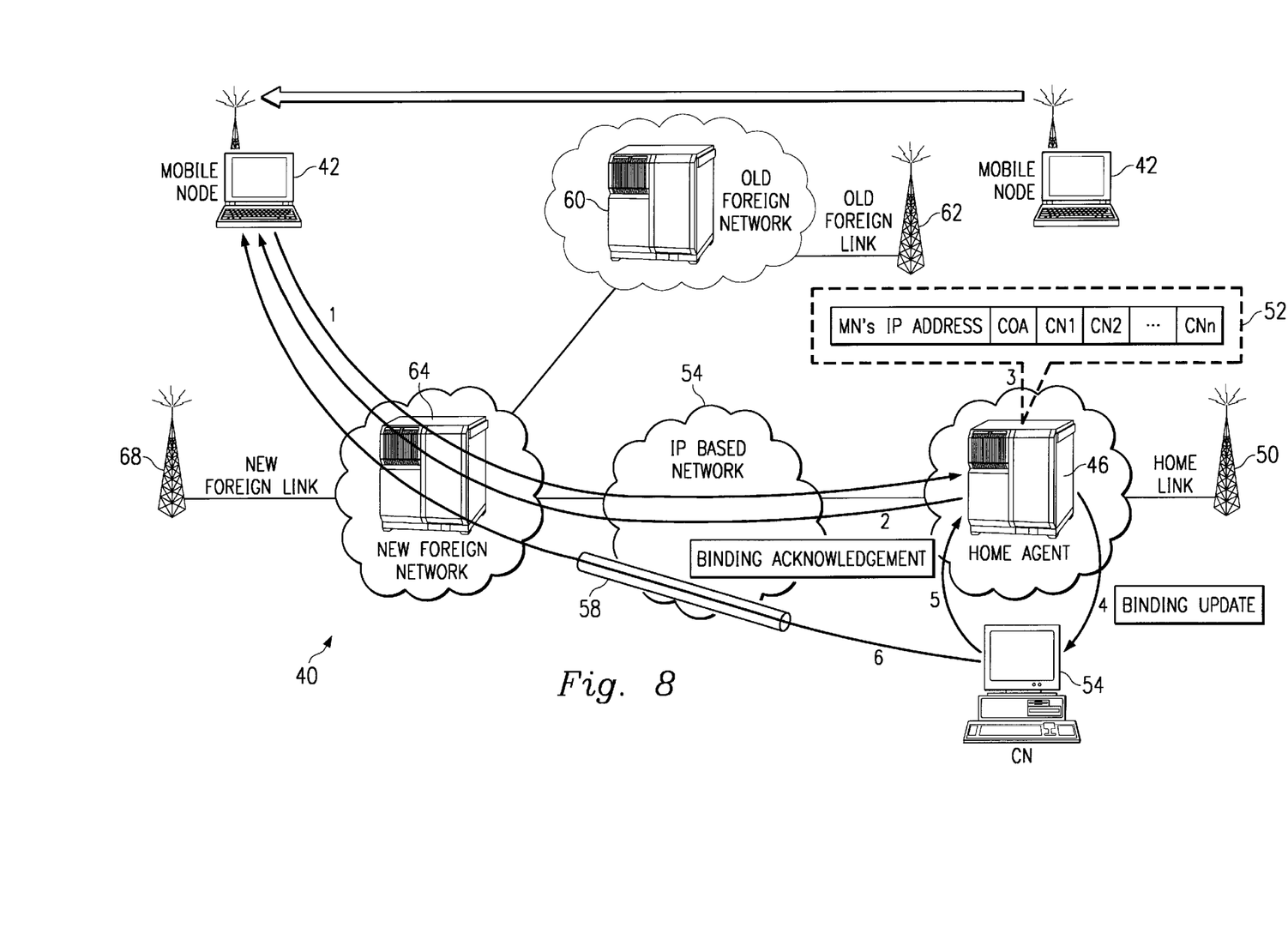
FIG. 8 is a diagrammatic view of a system depicting a correspondent node sending data packets to a mobile node via a new care-of-address of the present disclosure.

FIG. 8. depicts the mobile node 42 moving (roaming) from an old foreign network 60 to a new foreign network 64, where neither foreign network includes a foreign agent. When the mobile node 42 enters the new foreign network 64, it sends (1) a registration request with its new COA to the HA 46. The HA 46 then sends (2) a registration reply to the mobile node 42. The HA 46 compares (3) the mobile node's new COA against the old COA via the list 52 (maintained (3) by the HA) that includes the correspondent nodes associated with each mobile node. Since the new COA and the old COA are different, the HA 46 sends (4) a binding update to the correspondent node 54 (and all of the correspondent nodes—not shown—currently communicating with the mobile node 42). The correspondent node then sends (5) a binding acknowledgment to the HA 46 and is now able to send data (6) directly to the mobile node 42 via the new COA 58 (and the new foreign network 64 and link 68). As such, the correspondent node 54 may communicate directly with the mobile node 42 without the benefit of the capabilities of a foreign agent and in far fewer steps than possible with the prior art route optimization theory (as described in FIGS. 4 and 5).

If the mobile node returns to its HA, the previous mobile node entry should be removed from the correspondent node. To do so, the mobile node would send to the HA, a de-registration request when the mobile node returned to its home network (or location). The HA would then send to the correspondent node, a binding update message (sent to each correspondent node that the mobile node is currently communicating with), where the binding update message comprises a lifetime value of zero. The correspondent node would then invalidate the mobile nodes entry in its binding cache.

In an alternate embodiment for optimizing a route between a mobile node and a correspondent node in a wireless IP environment, the mobile node can maintain a list of correspondent nodes with which the mobile node is currently communicating. If the mobile node changes its address (i.e. roams to a different network), it may send a registration request to the HA with a correspondent node extension (CNE) that includes the list of correspondent nodes. The HA can then send, to each of the correspondent nodes on the list, a binding update. Each of the correspondent nodes would then send, to the HA, a binding acknowledgment message. The CNE includes a type field, a length field, a reserved field and a correspondent node internet protocol address that is used by the mobile node to communicate with the correspondent nodes. The correspondent node internet protocol address is sent with the binding update to allow the correspondent nodes to update their memory with the mobile nodes current address.

Figure 9:
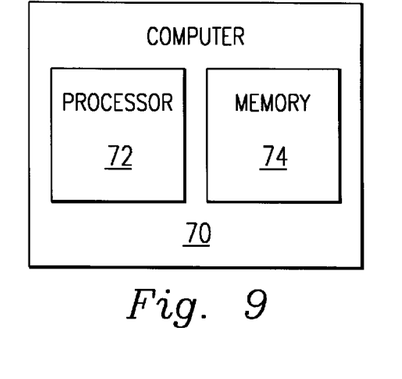
FIG. 9 is a diagrammatic view of a computer and memory of the present disclosure.

FIG. 9 depicts a computer 70 that comprises a processor 72 and memory 74. The computer 70 may be a personal computer or laptop, a mobile node, a correspondent node, a home agent, an old foreign network and a new foreign network, wherein the computer may be located in any portion of a wireless IP network. Additionally, the computer 70 may be any device that can send and receive IP related information. The processor 72 may be a central processing unit, digital signal processor, microprocessor, microcontroller, microcomputer, and/or any device that manipulates digital information based on programming instructions. The memory 74 may be read-only memory, random access memory, flash memory and/or any device that stores digital information. The memory 74 is coupled to the processor 72 and stores programming instructions that, when read by the processor, cause the processor to perform certain actions. These actions include sending data packets and messages to and from the home agent, the mobile node, any correspondent nodes, and/or any foreign agents as discussed herein.

Figure 10:
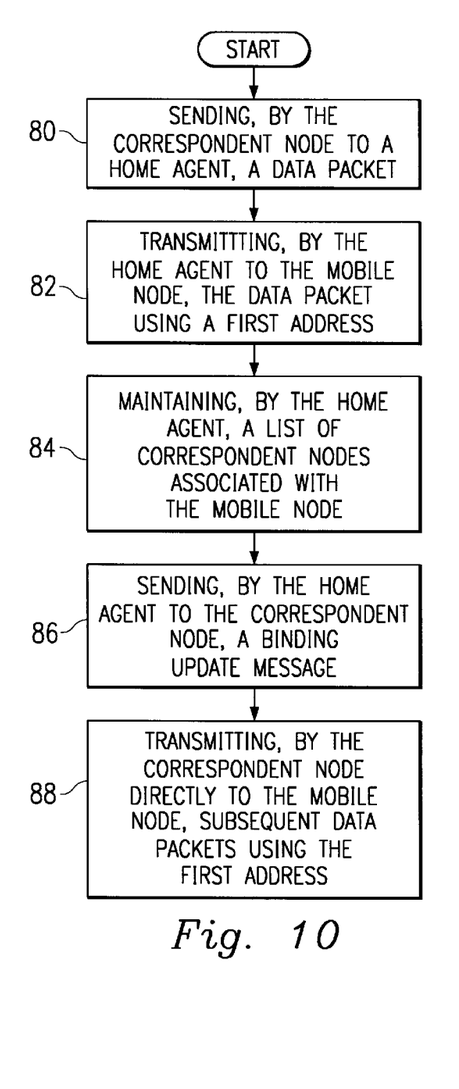
FIG. 10 is a flow chart of a method for optimizing a route between a mobile node and a correspondent node in a wireless internet protocol environment of the present disclosure.

FIG. 10 describes a method for optimizing a route between a mobile node and a correspondent node in a wireless IP environment. The method begins at step 80 where a correspondent node sends to a home agent, a data packet. At step 82, the home agent transmits to the mobile node, the data packet using a first address. At step 84, the home agent maintains a list of correspondent nodes associated with the mobile node. The method proceeds to step 86 where the home agent sends to the correspondent node, a binding update message. At step 88, the correspondent node directly transmits to the mobile node, subsequent data packets using the first address.

Figure 11:
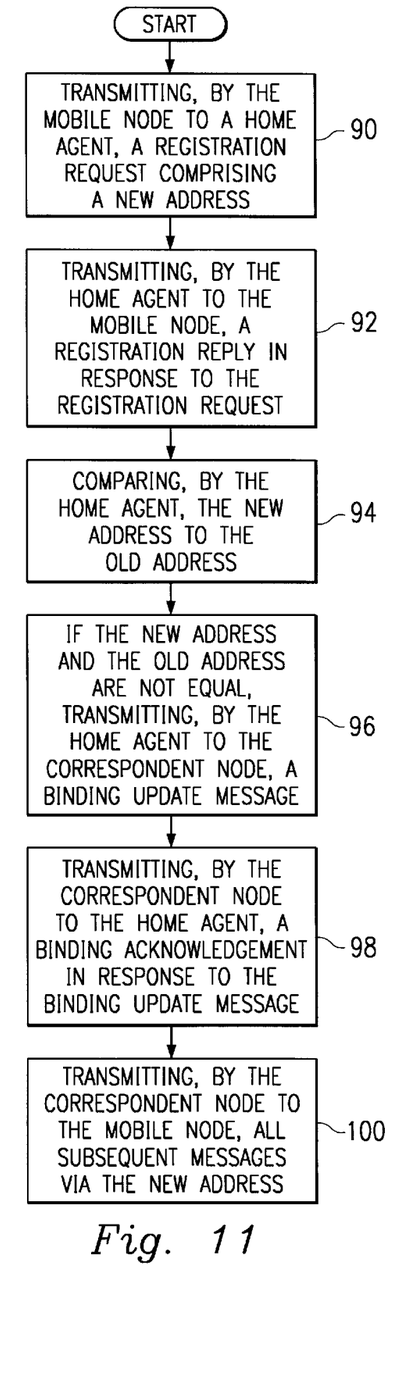
FIG. 11 is a flow chart of a method for optimizing a route between a mobile node and a correspondent node in a wireless internet protocol environment, where the mobile node has an old address from an old foreign network of the present disclosure.

FIG. 11 describes a method for optimizing a route between a mobile node and a correspondent node in a wireless IP environment, where the mobile node has an old address from an old foreign network. The method begins at step 90 where the mobile node transmits to a home agent, a registration request comprising a new address. At step 92, the home agent transmits to the mobile node, a registration reply in response to the registration request. At step 94, the home agent compares the new address to the old address and at step 96, if the new address and the old address are not equal, the home agent transmits to the correspondent node, a binding update message. The method proceeds to step 98 where the correspondent node transmits to the home agent, a binding acknowledgment in response to the binding update message. At step 100, the correspondent node transmits to the mobile node, all subsequent messages via the new address.

Figure 12:
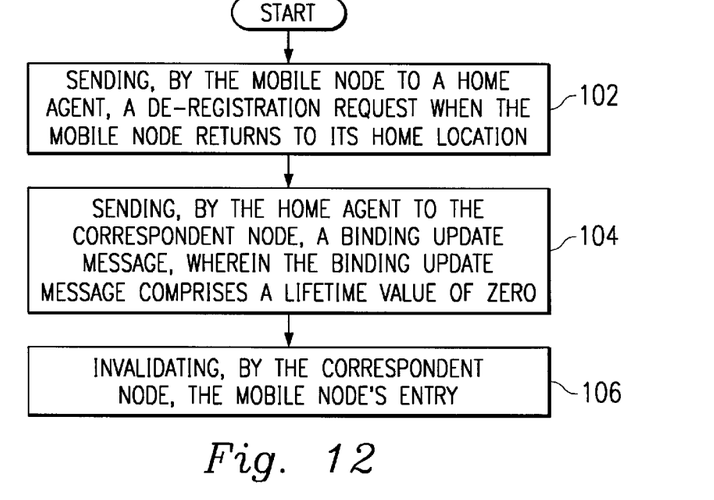
FIG. 12 is a flow chart of a method for removing a mobile node's entry from a correspondent node in a wireless internet protocol environment of the present disclosure.

FIG. 12 describes a method for removing a mobile node's entry from a correspondent node in a wireless IP environment. The method begins at step 102 where the mobile node sends to a home agent, a de-registration request when the mobile node returns to its home location. At step 104, the home agent sends to the correspondent node, a binding update message, where the binding update message comprises a lifetime value of zero. At step 106, the correspondent node invalidates the mobile node's entry.

Figure 13:
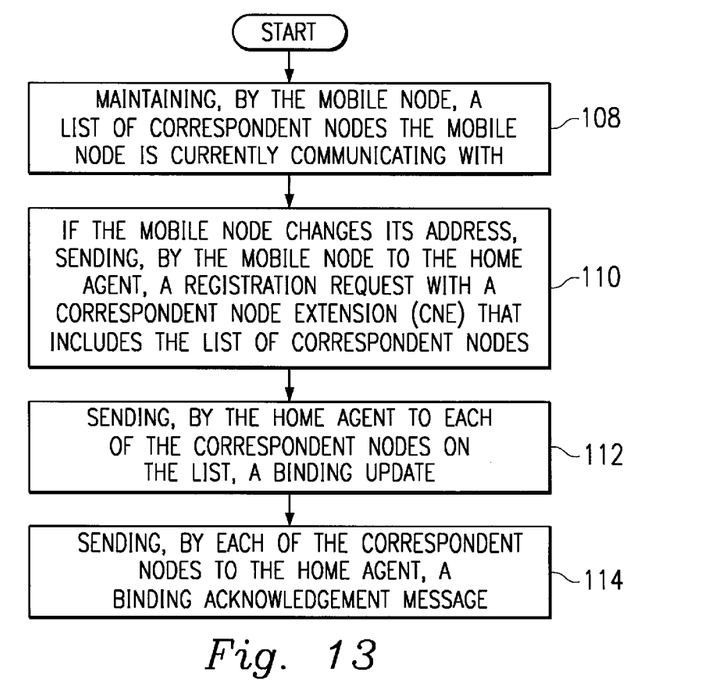
FIG. 13 is a flow chart of an alternate method for optimizing a route between a mobile node and a correspondent node in a wireless internet protocol environment of the present disclosure.

FIG. 13 describes an alternate method for optimizing a route between a mobile node and a correspondent node in a wireless IP environment. The method begins at step 108 where the mobile node maintains a list of correspondent nodes the mobile node is currently communicating with. At step 110, if the mobile node changes its address, the mobile node sends to the home agent, a registration request with a correspondent node extension (CNE) that includes the list of correspondent nodes. The method proceeds to step 112 where the home agent sends to each of the correspondent nodes on the list, a binding update. At step 114, each of the correspondent nodes sends to the home agent, a binding acknowledgment message.

The present invention thus enjoys several advantages. For example, the prior art route optimization theory is simplified because the binding request and binding warning messages are no longer used. As such, there is an efficient use of network bandwidth as these periodic messages are eliminated. Further, the system of the present invention can accommodate foreign networks with CCOA and foreign agent COA capabilities. Additionally, the correspondent node's binding cache is used efficiently as it is only updated when the mobile node changes its COA.

It is understood that variations may be made in the foregoing without departing from the scope of the present invention. For example, the system may include additional networks (such as a "multi-media" network), elements (that provide radio, voice and data services) and communication devices (such as cordless phones, computers, and "network appliances"). Additionally, it is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method for optimizing a route between a mobile node in a foreign network and a correspondent node in a wireless internet protocol environment, the method comprising the steps of:

sending, by the correspondent node to a home agent, a data packet;

transmitting, by the home agent to the mobile node, the data packet using a first address;

maintaining, by the home agent, a list of nodes in correspondence with the mobile node;

sending, by the home agent to the correspondent node, a binding update message; and transmitting, by the correspondent node directly to the mobile node and not to the home agent, subsequent data packets using the first address, where the foreign network does not contain a foreign agent.

2. The method of claim 1 further comprising the step of maintaining the mobile node's internet protocol address.

3. The method of claim 1, wherein the list comprises the internet protocol addresses of the nodes in the list.

4. The method of claim 1, wherein the subsequent data packets are transmitted to the mobile node via a foreign network.

5. A method for optimizing a route between a mobile node in a new foreign network and a correspondent node in a wireless internet protocol environment, the mobile node having an old address from an old foreign network, the method comprising the steps of:

transmitting, by the mobile node to a home agent, a registration request comprising a new address;

transmitting, by the home agent to the mobile node, a registration reply in response to the registration request;

comparing, by the home agent, the new address to the old address;

if the new address and the old address are not equal, transmitting, by the home agent to the correspondent node, a binding update message;

transmitting, by the correspondent node to the home agent, a binding acknowledgment in response to the binding update message; and transmitting, by the correspondent node to the mobile node, all subsequent messages via the new address, where the new foreign network does not contain a foreign agent.

6. The method of claim 5 further comprising the step of maintaining a list of old addresses and new addresses, wherein the addresses are internet protocol addresses of the mobile node.

7. The method of claim 5, further comprising the step of maintaining a list of correspondent nodes associated with the mobile node.

8. The method of claim 5, wherein the data packets are sent to the mobile node via a new foreign network.

9. The method of claim 5, wherein the data packets are received from the mobile node via the new foreign network.

10. A method for optimizing a route between a mobile node and a correspondent node in a wireless internet protocol environment, the method comprising the steps of:

maintaining, by the mobile node, a list of correspondent nodes the mobile node is currently communicating with;

if the mobile node changes its address, sending, by the mobile node to the home agent, a registration request with a correspondent node extension (CNE) that includes the list of correspondent nodes;

sending, by the home agent to each of the correspondent nodes on the list, a binding update; and sending, by each of the correspondent nodes to the home agent, a binding acknowledgment message.

11. The method of claim 10 wherein the CNE comprises at least one element selected from the group consisting of:

a type field;

a length field;

a reserved field; and a correspondent node internet protocol address.

12. The method of claim 11 wherein the correspondent node internet protocol address is used by the mobile node to communicate with the correspondent node.

13. The method of claim 11 wherein the correspondent node internet protocol address is sent with the binding update to allow the correspondent node to update its memory with the mobile node's current address.

14. A system for optimizing a route between a mobile node in a foreign network and a correspondent node in a wireless internet protocol environment, the system comprises:

means for sending, by the correspondent node to a home agent, a data packet;

means for transmitting, by the home agent to the mobile node, the data packet using a first address;

means for maintaining, by the home agent, a list of correspondent nodes associated with the mobile node;

means for sending, by the home agent to the correspondent node, a binding update message; and means for transmitting, by the correspondent node to the mobile node, subsequent data packets using the first address;

wherein the subsequent data packets are not sent via the home agent, where the foreign network does not contain a foreign agent.

15. The system of claim 14 further comprising means for maintaining, by the home agent, the mobile node's internet protocol address.

16. The system of claim 14, wherein the list of correspondent nodes comprises the internet protocol addresses of the correspondent nodes.

17. The system of claim 14, wherein the data packets are sent to the mobile node via a foreign network.

18. A system for optimizing a route between a mobile node in a new foreign network and a correspondent node in a wireless internet protocol environment, the mobile node having an old address from an old foreign network, the system comprises:

means for transmitting, by the mobile node to a home agent, a registration request comprising a new address;

means for transmitting, by the home agent to the mobile node, a registration reply in response to the registration request;

means for comparing, by the home agent, the new address to the old address;

if the new address and the old address are not equal, means for transmitting, by the home agent to the correspondent node, a binding update message;

means for transmitting, by the correspondent node to the home agent, a binding acknowledgment in response to the binding update message; and means for transmitting, by the correspondent node to the mobile node, all subsequent messages via the new address, where the new foreign network does not contain a foreign agent.

19. The system of claim 18 further comprising means for maintaining, by the home agent, a list of old addresses and new addresses, wherein the addresses are internet protocol addresses of the mobile node.

20. The system of claim 18, further comprising means for maintaining, by the home agent, a list of correspondent nodes associated with the mobile node.

21. The system of claim 18, wherein the data packets are sent to the mobile node via a new foreign network.

22. The system of claim 18, wherein the data packets are received from the mobile node via the new foreign network.

23. A system for optimizing a route between a mobile node and a correspondent node in a wireless internet protocol environment, the system comprises:

means for maintaining, by the mobile node, a list of correspondent nodes the mobile node is currently communicating with;

if the mobile node changes its address, means for sending, by the mobile node to the home agent, a registration request with a correspondent node extension (CNE) that includes the list of correspondent nodes;

means for sending, by the home agent to each of the correspondent nodes on the list, a binding update; and means for sending, by each of the correspondent nodes to the home agent, a binding acknowledgment message.

24. The system of claim 23 wherein the CNE comprises at least one element selected from the group consisting of:

a type field;
a length field;
a reserved field; and
a correspondent node internet protocol address.

25. The system of claim 24 wherein the correspondent node internet protocol address is used by the mobile node to communicate with the correspondent node.

26. The system of claim 24 wherein the correspondent node internet protocol address is sent with the binding update to allow the correspondent node to update its memory with the mobile node's current address.

27. A computer comprising: a processor; and memory coupled to the processor, wherein the memory stores programming instructions that, when read by the processor, cause the processor to:

receive, from a correspondent node, a data packet;

transmit, to a mobile node, the data packet using a first address, the mobile node maintaining a list of correspondent nodes associated with the mobile node; and send, to the correspondent node, a binding update message so that the correspondent node can transmit to the mobile node, without additional routing assistance from the home agent, subsequent data packets using the first address, and without additional routing assistance from a foreign agent.

28. The computer program memory of claim 27 further comprising programming instructions that cause the processor to maintain the mobile node's internet protocol address.

29. The computer program memory of claim 27, wherein the list of correspondent nodes comprises the internet protocol addresses of the correspondent nodes.

30. The computer program memory of claim 27, wherein the data packets are sent to the mobile node via a foreign network.

31. A computer comprising: a processor; and memory coupled to the processor, wherein the memory stores programming instructions that, when read by the processor, cause the processor to:

receive, at a home agent, a registration request comprising a new address;

transmit, to a mobile node, a registration reply in response to the registration request;

compare the new address to an old address;

if the new address and the old address are not equal, transmit, to the correspondent node, a binding update message; and receive, from the correspondent node, a binding acknowledgment in response to the binding update message so that the correspondent node can transmit, to the mobile node, all subsequent messages via the new address, and without additional routing assistance from a foreign agent.

32. The computer program of claim 31 further comprising instructions for maintaining a list of old addresses and new addresses, wherein the addresses are internet protocol addresses of the mobile node.

33. The computer of claim 31, further comprising programming instructions that cause the processor to:

receive, from the mobile node, a list of correspondent nodes associated with the mobile node.

34. The computer program of claim 31, wherein the data packets are sent to the mobile node via a new foreign network.

35. The computer program of claim 31, wherein the data packets are received from the mobile node via the new foreign network.

36. A computer comprising: a processor; and memory coupled to the processor, wherein the memory stores programming instructions that, when read by the processor, cause the processor to:

maintain a list of correspondent nodes a mobile node is currently communicating with;

if the mobile node changes its address, send, to a home agent, a registration request with a correspondent node extension (CNE) that includes the list of correspondent nodes wherein the CNE comprises at least one element selected from the group consisting of:
a type field;
a length field;
a reserved field; and
a correspondent node internet protocol address;

send, by the home agent to each of the correspondent nodes on the list, a binding update; and send, by each of the correspondent nodes to the home agent, a binding acknowledgment message.

37. The computer of claim 36 wherein the CNE comprises a correspondent node internet protocol address that is used by the mobile node to communicate with the correspondent node.

38. The computer of claim 36 wherein the CNE comprises a correspondent node internet protocol address that is sent with the binding update to allow the correspondent node to update its memory with the mobile node's current address.

* * * * *